United States Patent
Kawaguchi et al.

(10) Patent No.: US 8,467,942 B2
(45) Date of Patent: Jun. 18, 2013

(54) GEAR DRIVE CONTROLLER, GEAR DRIVE CONTROL METHOD, TURNING OPERATION CONTROLLER, AND CONSTRUCTION MACHINE

(75) Inventors: Tadashi Kawaguchi, Hiratsuka (JP); Jun Morinaga, Hiratsuka (JP)

(73) Assignee: Komatsu, Ltd., Tokyo (JP)

( * ) Notice: Subject to any disclaimer, the term of this patent is extended or adjusted under 35 U.S.C. 154(b) by 1604 days.

(21) Appl. No.: 11/575,854

(22) PCT Filed: Sep. 22, 2005

(86) PCT No.: PCT/JP2005/017502
§ 371 (c)(1),
(2), (4) Date: Mar. 22, 2007

(87) PCT Pub. No.: WO2006/033401
PCT Pub. Date: Mar. 30, 2006

(65) Prior Publication Data
US 2008/0249691 A1    Oct. 9, 2008

(30) Foreign Application Priority Data
Sep. 24, 2004   (JP) .................................. 2004-278210

(51) Int. Cl.
G06F 7/70     (2006.01)
G06F 19/00    (2011.01)
G06G 7/00     (2006.01)
G06G 7/76     (2006.01)

(52) U.S. Cl.
USPC .......................................................... 701/50

(58) Field of Classification Search
USPC ................ 74/718, 640, 441, 440, 409; 318/7, 318/630, 568.1; 475/342; 701/50
See application file for complete search history.

(56) References Cited

U.S. PATENT DOCUMENTS 5,448,148 A   9/1995 Devier
5,860,500 A * 1/1999 Olsen et al. ................... 192/3.29

(Continued)

FOREIGN PATENT DOCUMENTS

JP   9-142787 A   6/1997
JP   9-238490 A   9/1997

(Continued)

OTHER PUBLICATIONS

English translation of International Preliminary Report on Patentability, Chapter I of the Patent Cooperation Treaty for PCT/JP2005/017502, 4 sheets.
Extended European Search Report dated May 28, 2010, in English in counterpart European Application No. 05785950.6.

*Primary Examiner* — Khoi Tran
*Assistant Examiner* — Nicholas Kiswanto
(74) *Attorney, Agent, or Firm* — Holtz, Holtz, Goodman & Chick, P.C.

(57) ABSTRACT

A rotation controller of an electric rotary excavator is provided with a gear drive controller that includes a backlash determination device and a torque limit setting device. With the arrangement, since an output torque of an electric motor is limited by a torque limit when a backlash is eliminated, an excessive torque is prevented from being output. After that, the output torque is gradually changed by an output control device of the gear drive controller. Accordingly, since acceleration and deceleration of a rotary body is performed without causing an operator to feel uncomfortableness, a shock generated when the backlash is eliminated can be suppressed. As a result, smooth rotation operation free from an influence of the backlash can be realized.

6 Claims, 13 Drawing Sheets

U.S. PATENT DOCUMENTS

| | | | |
|---|---|---|---|
| 6,569,059 B1 * | 5/2003 | Ito | 477/110 |
| 6,905,438 B2 * | 6/2005 | Suzuki et al. | 477/5 |
| 2004/0034461 A1 * | 2/2004 | Kadota | 701/67 |
| 2004/0040759 A1 * | 3/2004 | Shimizu et al. | 180/65.2 |
| 2005/0028760 A1 * | 2/2005 | Akihisa et al. | 123/48 R |
| 2005/0098125 A1 * | 5/2005 | Hathaway et al. | 123/90.1 |

FOREIGN PATENT DOCUMENTS

| | | |
|---|---|---|
| JP | 10-122311 A | 5/1998 |
| JP | 2001-011897 A | 1/2001 |
| JP | 2001-051722 A | 2/2001 |
| JP | 2001-339973 A | 12/2001 |

* cited by examiner

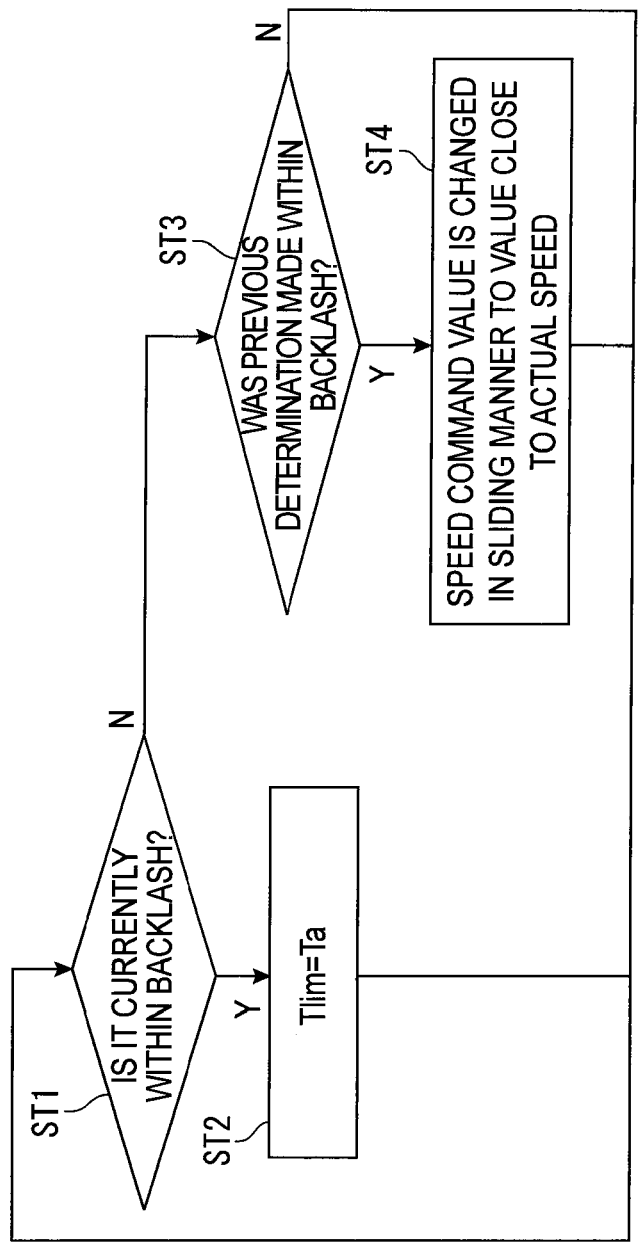

GEAR DRIVE CONTROLLER, GEAR DRIVE CONTROL METHOD, TURNING OPERATION CONTROLLER, AND CONSTRUCTION MACHINE

This application is a U.S. National Phase Application under 35 USC 371 of International Application PCT/JP2005/017502 filed Sep. 22, 2005.

TECHNICAL FIELD

The present invention relates to a gear drive controller and a gear drive control method for controlling the drive of gears meshing with each other including a backlash therebetween, a rotation controller equipped with such a gear drive controller and a construction machine.

BACKGROUND ART

Conventionally, a construction machine such as an excavator having an upper rotary body is arranged so that the rotary body rotates with respect to its frame via a swing circle.

In these days, there has been developed a hybrid electric rotary excavator in which a rotary body is driven not by a hydraulic motor but by an electric motor, and work machines and a base carrier are driven by a hydraulic actuator (refer to, for example, Patent Document 1)

In such an electric rotary excavator, rotation of the rotary body is driven by the electric motor. Therefore, even when the rotary body is rotated along with a raising operation of hydraulically driven boom and arm, the rotation of the rotary body is not affected by the raising operation of the boom and arm. Therefore, compared to the case where the rotary body is also hydraulically driven, a loss in control valves and the like can be reduced, resulting in satisfactory energy efficiency.

[Patent Document 1] Japanese Patent Laid-Open Publication No. 2001-11897

DISCLOSURE OF THE INVENTION

Problems to be Solved by the Invention

In the case where the rotary body is driven to rotate via the swing circle, a driving gear meshing with a driven gear formed on the swing circle is driven by a hydraulic motor or electric motor. A backlash is included between the driven gear and the driving gear at the motor side. Therefore, for example, at a rotation start point, the driving gear starts to rotate first, and then, at a point when the two gears come into contact with each other, the backlash is eliminated. At a point when deceleration operation starts from a constant speed rotation operation, the rotary body equipped with the driving gear continues to rotate due to its own inertia, so that at a point when the gears come into contact with each other on a side opposite to the side at the rotation start point, the backlash is eliminated.

When a rotation state of the rotary body is changed in a discontinuous manner due to the elimination of the backlash, a control of the motor is disturbed, which degrades ride comfort of a construction machine. Specifically, the conventional control of the motor is adapted to output an excess output torque at a point when the backlash is eliminated. As a result, a sudden operation is made at a point when the rotary body starts to rotate or decelerate, which causes an operator to feel a large shock. Especially, when the rotary body is driven by an electric motor like an electric rotary excavator, since the response to the rotation operation is faster than that of a hydraulic motor, the operator feels even larger shock. It is requested to solve the problem.

An object of the present invention is to provide a gear drive controller and a gear drive control method that can realize, in an arrangement in which driving gears include a backlash therebetween, a smooth drive so that an operator does not feel an influence of the backlash, a rotation controller equipped with such a gear drive controller and a construction machine.

Means for Solving the Problems

According to an aspect of the present invention, a gear drive controller that controls a drive of a driving gear of gears meshing with each other including a backlash therebetween includes: a backlash determination means that determines whether the driving gear or a driven gear is rotating within the backlash; a command value storage means that stores a command value for changing an output torque of a drive source; a torque limit setting means that, when determined that the driving gear or the driven gear is rotating within the backlash, sets a torque limit so as to limit the output torque of the drive source at a point of elimination of the backlash; and an output control means that controls the command value to gradually change so that the output torque of the drive source is gradually changed to an upper or lower limit after the backlash is eliminated.

It should be noted that the term "output torque" herein includes a drive torque in acceleration and a braking torque in deceleration.

According to the aspect of the present invention, at a point of elimination of the backlash (at a point when the backlash is removed), since the output torque of the drive source is limited by the torque limit, an excessive torque is prevented from being output. Since the output torque is changed gradually after that, the rotary body can be accelerated or decelerated without causing uncomfortableness of a user. Accordingly, a shock generated at a point of elimination of the backlash is suppressed, and thus a smooth rotation is realized without causing the operator to feel the influence of the backlash.

In the gear drive controller according to the aspect of the present invention, it is preferable that the command value is a torque limit and the output control means gradually changes the output torque to the upper or lower limit by gradually changing the torque limit.

According to the aspect of the present invention, since the output torque changes within the gradually changed torque limit, the output torque can be reliably changed smoothly along the torque limit.

In the gear drive controller according to the aspect of the present invention, it is preferable that the command value is a speed command value output according to a rotation operation, and the output control means changes the speed command value to a value close to an actual speed immediately after the backlash is eliminated, the output control means thereby gradually changing the output torque to the upper or lower limit.

According to the aspect of the present invention, since the speed command value is changed to a value close to the actual speed immediately after the backlash is eliminated, the speed command value is sequentially changed from that value, thereby gradually changing the output torque based on the speed command value. In this case, unlike the above-mentioned aspect of the present invention in which the torque limit is gradually changed and the output torque is changed along the torque limit, the torque limit being changed is prevented from being affected by external noises, so that a control free from external noise can be achieved, resulting in an enhanced reliability.

According to another aspect of the present invention, a rotation controller that controls a rotary body that rotates via gears meshing with each other including a backlash therebetween includes the above-described gear drive controller of the present invention that controls a drive of the driving gear.

According to the aspect of the present invention, since the above-mentioned gear drive controller of the present invention is provided, the rotation controller, which provides the same effects, can be obtained.

According to still another aspect of the present invention, a gear drive control method for controlling a drive of a driving gear of gears meshing with each other including a backlash therebetween includes: determining whether the driving gear or the driven gear is rotating within the backlash; when determined that the driving gear or the driven gear is rotating within the backlash, setting a torque limit so as to limit an output torque of a drive source at a point of elimination of the backlash; and gradually changing the output torque of the drive source to an upper or lower limit after the backlash is eliminated.

According to the aspect of the present invention, the same effects as those of the above-mentioned gear drive controller of the present invention can be obtained.

According to further aspect of the present invention, a construction machine includes: a rotary body that rotates via gears meshing with each other including a backlash therebetween; and the above-described rotation controller of the present invention that controls the rotary body.

According to the aspect of the present invention, since the above-mentioned rotation controller of the present invention is provided, a construction machine, which provides the same effects, can be realized.

BRIEF DESCRIPTION OF DRAWINGS

FIG. 10 is a flowchart showing a setting flow of a torque limit and a speed command value;

EXPLANATION OF CODES

Figure 1:
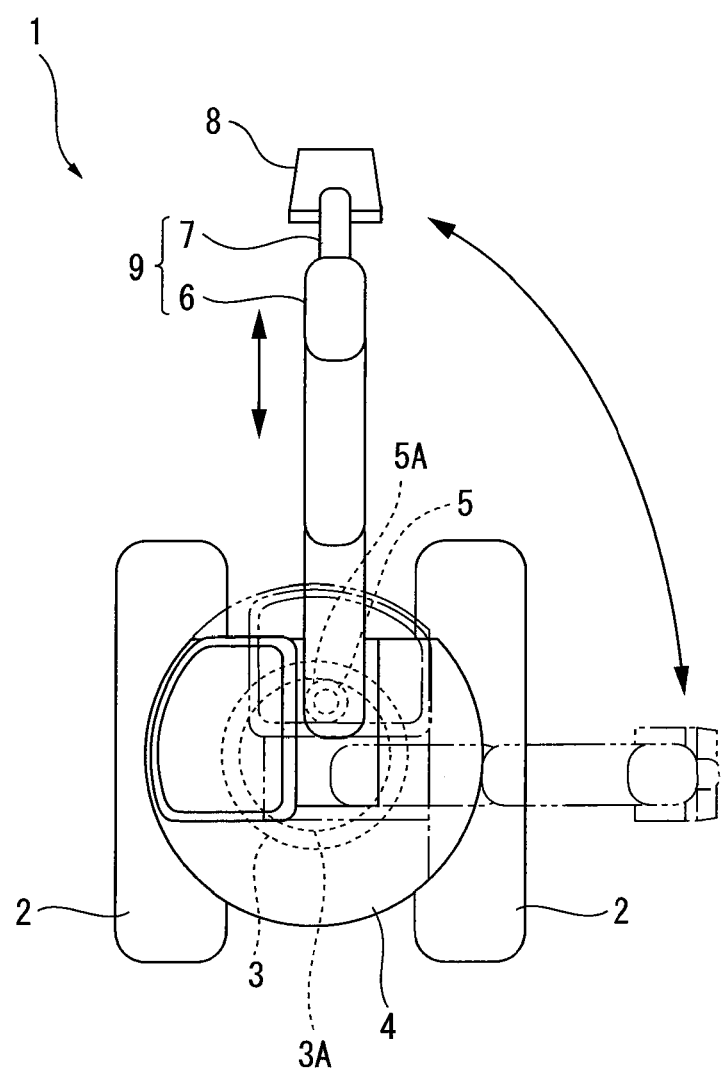
FIG. 1 is a plan view showing a construction machine according to a first embodiment of the present invention.

1: electric rotary excavator (construction machine)
3A: driven gear
4: rotary body
5: electric motor (drive source)
5A: driving gear
50: rotation controller
60: gear drive controller
61: backlash determination means
62: command value storage means
63: torque limit setting means
64: output control means.

BEST MODE FOR CARRYING OUT THE INVENTION

First Embodiment

[1-1] Overall Arrangement

A first embodiment of the present invention will be described below with reference to the drawings.

Figure 2:
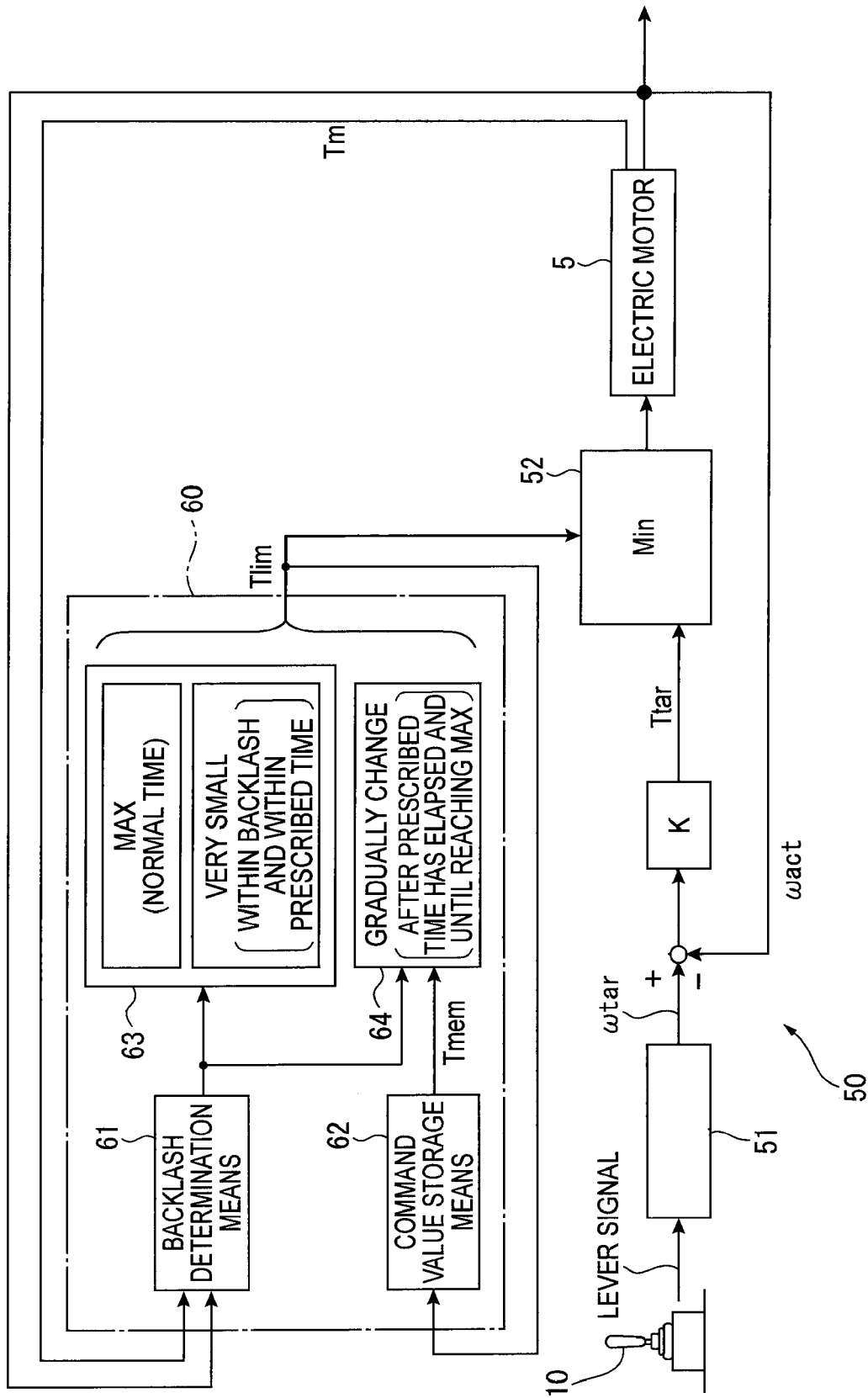
FIG. 2 is a diagram for illustrating a rotation controller and a gear drive controller according to the first embodiment.

FIG. 1 is a plan view showing an electric rotary excavator (construction machine) 1 according to the first embodiment. FIG. 2 is a diagram for illustrating a rotation controller 50 and a gear drive controller 60 mounted on the electric rotary excavator 1.

Referring to FIG. 1, the electric rotary excavator 1 has a rotary body 4 provided on a truck frame of a base carrier 2 via a swing circle 3. The rotary body 4 is driven to rotate by an electric motor (drive source) 5 via a driving gear 5A meshing with a driven gear 3A that is provided on the swing circle 3. The power source for the electric motor 5 is an electric generator (not shown) mounted on the rotary body 4, the electric generator driven by an engine (not shown).

The rotary body 4 is provided with a boom 6, an arm 7 and a bucket 8 constituting a work machine 9, each of which is driven to operate by hydraulic cylinders (not shown). The hydraulic source for the respective hydraulic cylinders is a hydraulic pump (not shown) driven by the engine. Therefore, the electric rotary excavator 1 is a hybrid construction machine equipped with the hydraulically driven work machine 9 and the electrically driven rotary body 4.

According to the electric rotary excavator 1, a rotation lever 10 (which typically serves also as a work machine lever for operating the arm 7) outputs a lever signal according to a tilting angle thereof to the rotation controller 50 as shown in FIG. 2. The rotation controller 50 controls the drive of the electric motor 5 based on the lever signal, thereby controlling the rotation of the rotary body 4.

Specifically, the lever signal is first input to a speed command value generating means 51 of the rotation controller 50 and is converted therein into a speed command value $\omega_{tar}$. A difference between the speed command value $\omega_{tar}$ and a fed-back actual speed $\omega_{act}$ of the electric motor 5 is multiplied by a speed gain K to convert the difference value into a torque command value $T_{tar}$. Accordingly, when the actual speed is not increased even when the rotation lever 10 is tilted to a large extent, the torque command value Ttar is controlled to increase closer to the speed command value ωtar. The above control is a speed control, which is generally known as P (Proportional) control. The converted torque command value Ttar is output to an inverter 52. Also, the rotation controller 50 is provided with the gear drive controller 60 for controlling the drive of the gear 5A. A torque limit (command value) Tlim of the electric motor 5, which is set by the gear drive controller 60, is also output to the inverter 52.

The inverter 52 has a comparator section. As shown in FIG. 2, the comparator section compares the torque command value Ttar that is based on the input lever signal with the value of the torque limit Tlim that is obtained by the gear drive controller 60, and selects the smaller one. Accordingly, at a rotation start point or deceleration start point, a minimum value of the torque limit Tlim obtained by the gear drive controller 60 and a variable value of the torque limit Tlim are selected as final command values for the electric motor 5.

With the arrangement, discontinuous rotation caused by the backlash at the rotation start point and the deceleration start point of the rotary body is improved, so that the shock an operator feels can be reduced. Thus, the torque limit Tlim is a command value of the same level as the torque command value Ttar in that the value commands the torque of the electric motor 5. The inverter 52 converts the final command value into a current value or a voltage value, thereby controlling the electric motor 5 to drive at the speed of the command value ωtar.

[1-2] Arrangement of Gear Drive Controller

Figure 3:
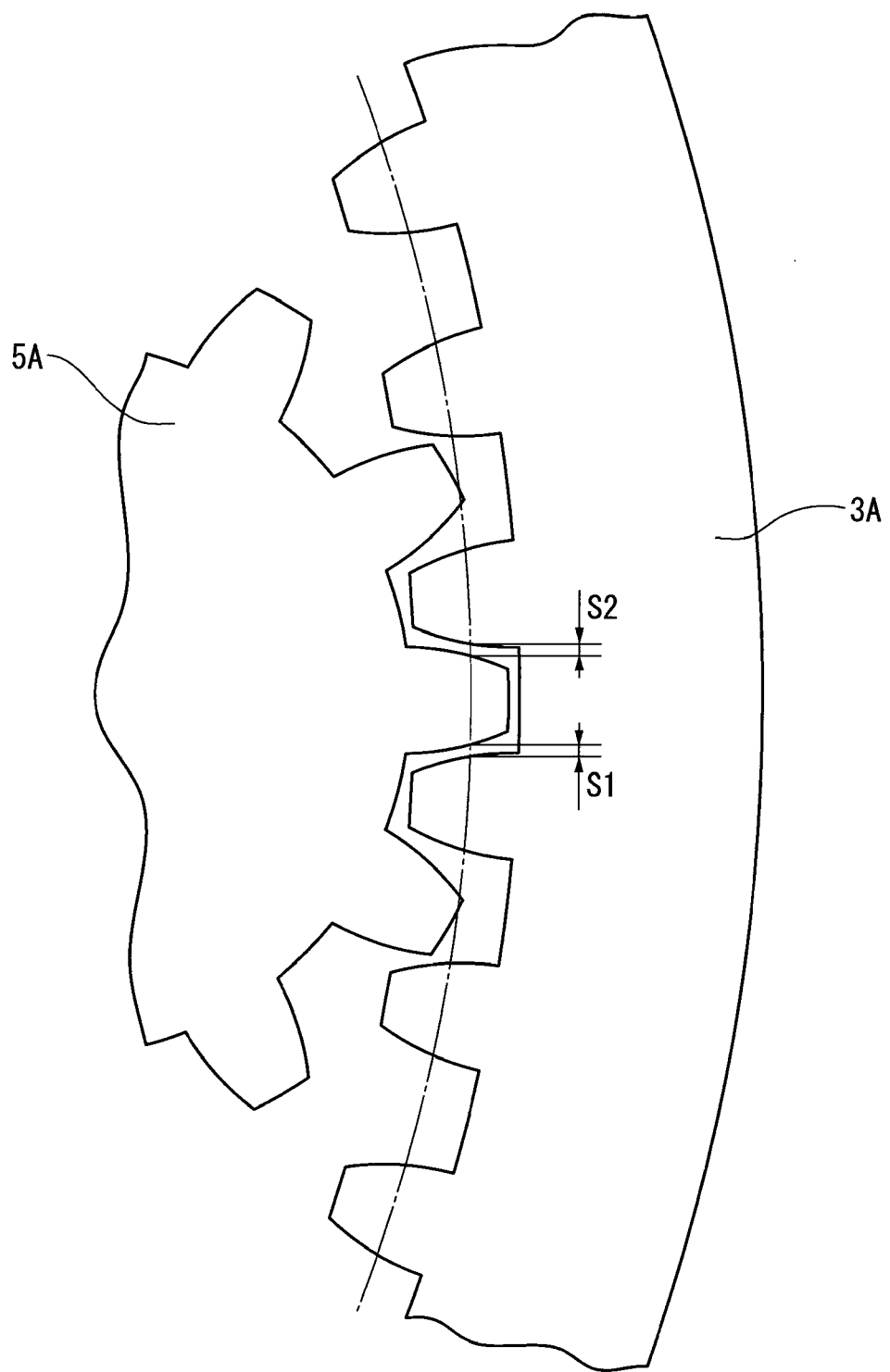
FIG. 3 is a view for illustrating a backlash.

Referring now to FIG. 2 and FIG. 3, the arrangement of the gear drive controller 60 will be described below.

The gear drive controller 60 controls the drive of the gear 5A by controlling the drive of the electric motor 5 in accordance with a meshing state between the driven gear 3A and the driving gear 5A. For this purpose, the gear drive controller 60 of the first embodiment includes a backlash determination means 61, a command value storage means 62, a torque limit setting means 63 and an output control means 64 as shown in FIG. 2.

The backlash determination means 61 determines whether the gear 5A is rotating within the backlash based on a feedback actual speed ωact and an output torque Tm of the electric motor 5. This arrangement enables the backlash determination means 61 to determine whether the backlash has been eliminated. Herein, the wording "rotate within the backlash" means a state in which the gear 3A and the gear 5A are out of contact as shown in FIG. 3; i.e., a rotation in a state of gap S1≠0 and gap S2≠0. Also, the wording "backlash has been eliminated" means a state in which the tooth flanks, on a side where the gap is removed, are in contact with each other due to a relative difference in speed between the gear 3A and the gear 5A. For example, referring to FIG. 3, when the gear 5A is in acceleration in the clockwise direction, the gap S1 is removed due to the relative difference in speed between the gear 3A and the gear 5A, resulting in a state of gap S1=0. On the other hand, when the gear 5A is in deceleration in the clockwise direction, the gap S2 is removed, resulting in a state gap S2=0.

Referring back to FIG. 2, the command value storage means 62 stores the torque limit Tlim output to the comparator section of the inverter 52.

The torque limit setting means 63 sets the torque limit Tlim according to the determination result of the backlash determination means 61. Specifically, when the torque limit setting means 63 determines that the gear 5A is rotating within the backlash, the torque limit setting means 63 sets the torque limit Tlim to a prescribed value, thereby limiting the output torque Tm of the electric motor 5.

The output control means 64 changes the torque limit Tlim according to the determination result of the backlash determination means 61. Specifically, when the torque limit setting means 63 determines that the gear 5A is not rotating within the backlash; i.e., after the backlash is eliminated, the output control means 64 controls to change the torque limit Tlim sequentially from a value Tmem stored in the command value storage means 62 such that the output torque of the electric motor 5 is gradually changed to an upper or lower limit.

[1-3] Torque Limit Generating Flow in Gear Drive Controller

Referring now to flowcharts in FIG. 4 and FIG. 5, a torque limit generating flow in the gear drive controller will be described.

Figure 4:
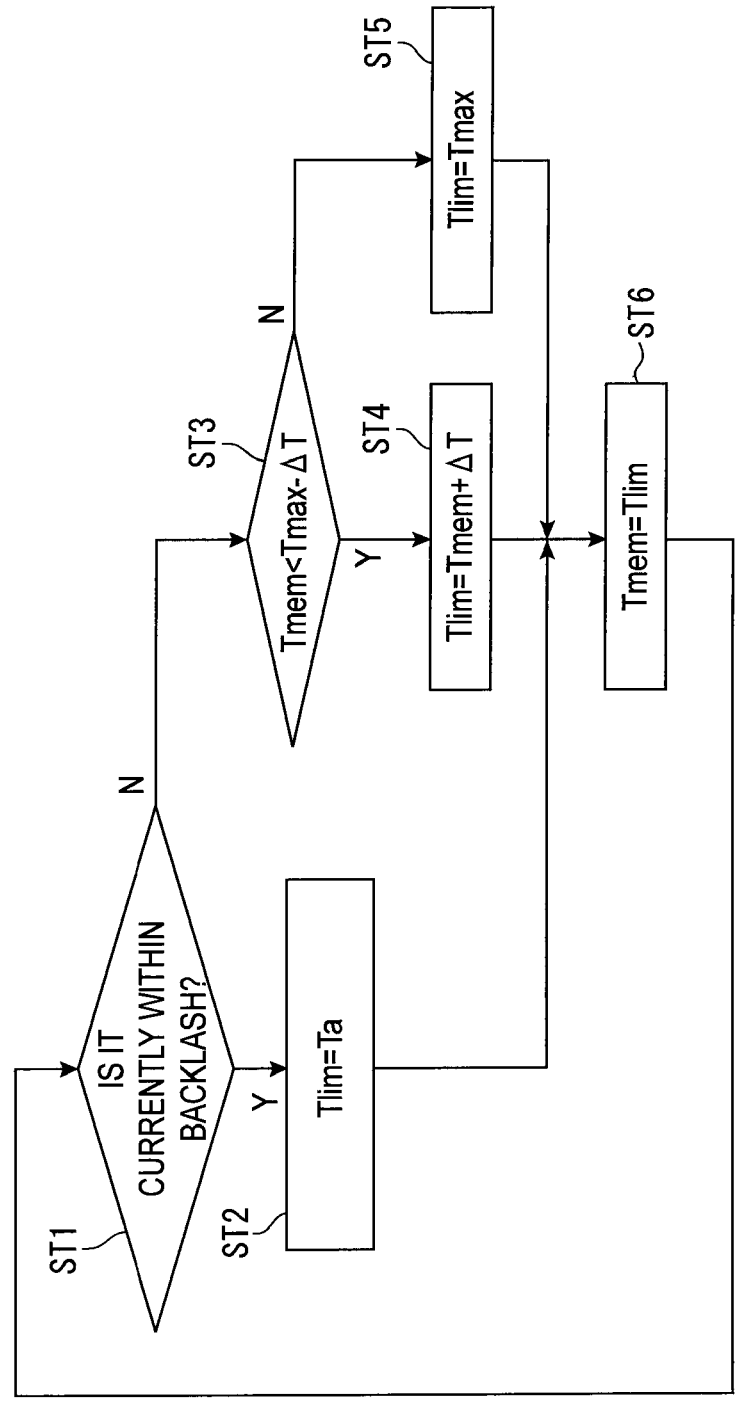
FIG. 4 is a flowchart showing a torque limit generating flow.

As shown in FIG. 4, the backlash determination means 61 determines whether the driving gear 5A is rotating within the backlash at a rotation start point or a deceleration start point of the rotary body 4 (ST1).

Figure 5:
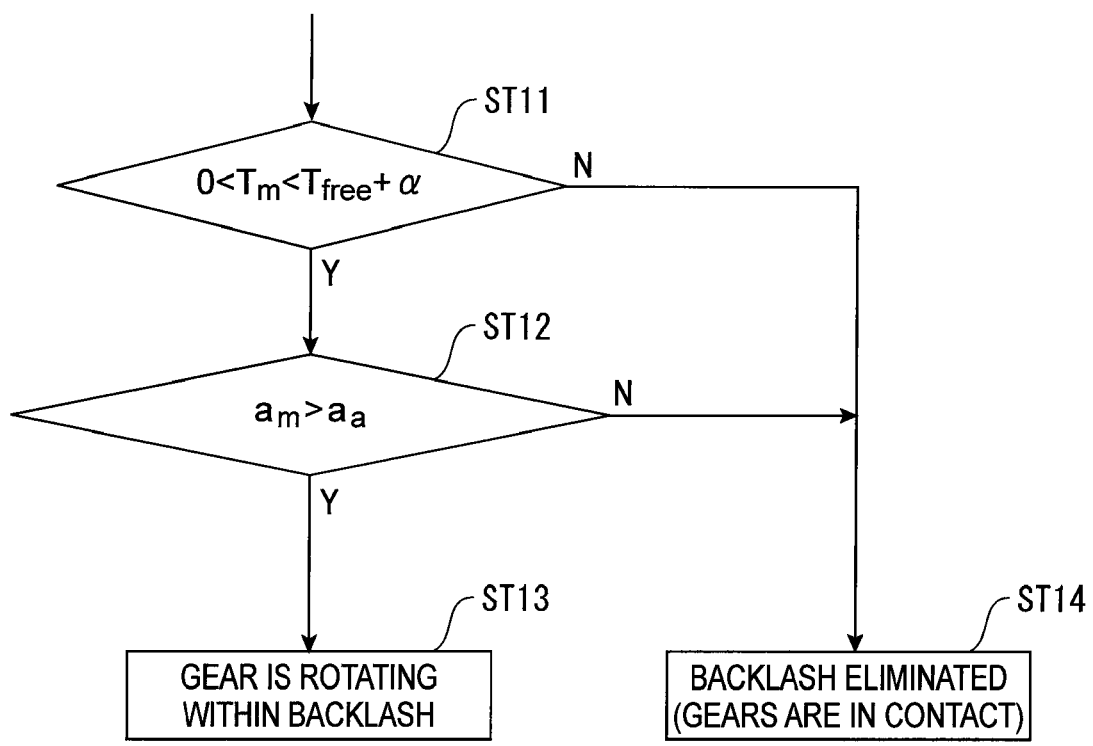
FIG. 5 is a flowchart showing a backlash determination method.

Specifically, as shown in FIG. 5, the backlash determination means 61 first determines whether the output torque Tm of the electric motor 5 is smaller than a value obtained by adding a prescribed value α to an acceleration torque Tfree of the electric motor 5 driving with no load, namely determines whether the output torque Tm is substantially equal to the acceleration torque Tfree (ST11). Then, when the values are substantially equal to each other, the backlash determination means 61 determines whether an angular acceleration am of the electric motor 5 is equal to or greater than a prescribed value $a_a$ (ST12). When the angular acceleration am is equal to or greater than the prescribed value $a_a$, the backlash determination means 61 determines that the gear 5A is rotating within the backlash (ST13). In other words, when the electric motor 5 is in acceleration or deceleration while substantially no torque is output, it means that the gear 5A is in idle running within the backlash, and thus the backlash determination means 61 determines that the gear 5A is within the backlash. The acceleration torque Tfree in idle running is obtained by multiplying the moment of inertia of a rotor constituting the electric motor 5 by the angular acceleration am.

On the other hand, in ST11, when the output torque Tm is larger than the value that is obtained by adding the prescribed value α to the acceleration torque Tfree of the electric motor 5 in idle running, it means that the gear 5A is in acceleration or deceleration with the gears being in contact, and thus the backlash determination means 61 determines that the backlash has been eliminated (ST14). When almost no output torque Tm is output and the angular acceleration am is smaller than the prescribed value in ST12, it means that the rotary body 4 is rotating at a constant speed with the backlash been eliminated, and in this case also, the backlash determination means 61 determines that the gears are in contact (ST14).

Referring back to FIG. 4, when it is determined that the gear 5A is rotating within the backlash in ST1, the torque limit setting means 63 limits the torque limit Tlim, which is the maximum torque that the electric motor 5 can output, to a prescribed very small value Ta from a MAX value Tmax of a normal time (ST2), and outputs the limited value of the torque limit to the comparator section of the inverter 52. The limitation to the very small value Ta is maintained until a prescribed time elapses after the backlash is eliminated.

On the other hand, when it is determined that the backlash between the gear 5A and the gear 3A has been eliminate and the gears are in contact, the output control means 64 determines whether the value Tmem stored in the command value storage means 62 is equal to or smaller than Tmax, namely whether or not the torque limit is being limited by the torque limit setting means 63 (ST3). If not, the normal MAX value Tmax is applied (ST5). On the other hand, at a point of the first determination immediately after the prescribed time has elapsed from the elimination of the backlash, the torque limit Tlim is limited to the very small value Ta. Accordingly, the determination in the ST3 is "Y", and the process proceeds to ST4.

In ST4, when it is the rotation start point, the value of the torque limit Tlim of the very small value Ta is changed toward the upper limit by a constant value ΔT. When it is the deceleration start point, the value of the torque limit Tlim is changed toward the lower limit by the constant value ΔT, and the process returns to ST1 in the sate in which the torque limit is being limited. The final torque limit Tlim including the obtained value is stored as Tmem by the command value storage means 62 (ST6). After that, the process continuously proceeds from ST1 to ST3 and ST4. And when it is the rotation start point, the value of the torque limit Tlim is changed sequentially from the stored value Tmem to the upper limit by the constant value ΔT. When it is the deceleration start point, the value of the torque limit Tlim is changed sequentially from the stored value Tmem toward the lower limit by the constant value ΔT. The torque limit Tlim is continuously changed until the value reaches the upper or lower MAX value.

[1-4] Control Method by Gear Drive Controller

Referring now to FIGS. 6 through 8, a control method by the gear drive controller 60 will be described while showing a relationship with the rotation controller 50.

Figure 6A:
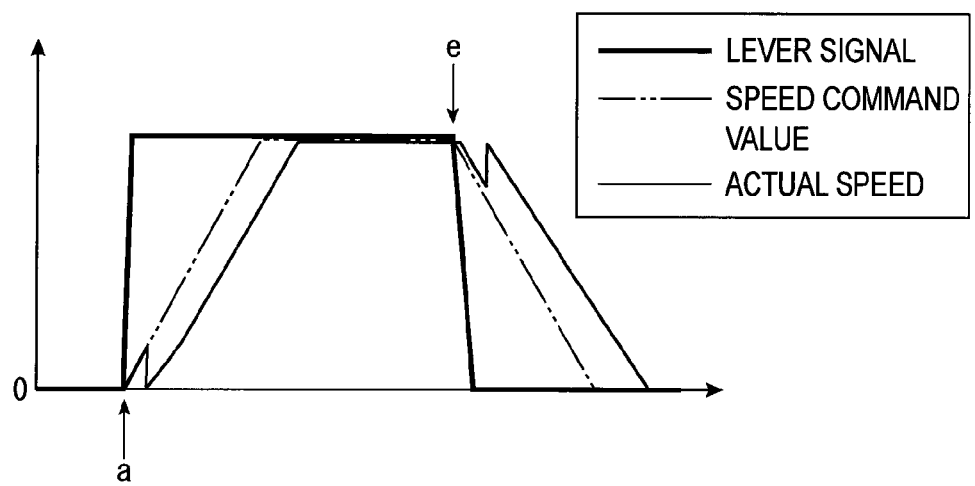
FIG. 6A is a diagram for illustrating in detail a rotation control method of the first embodiment.
Figure 6B:
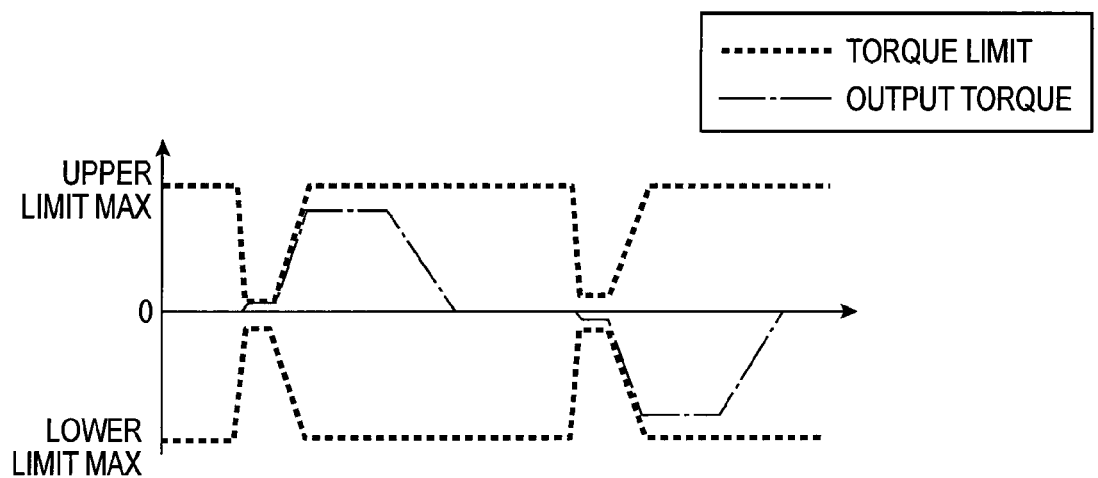
FIG. 6B is another diagram for illustrating in detail the rotation control method of the first embodiment.
Figure 7A:
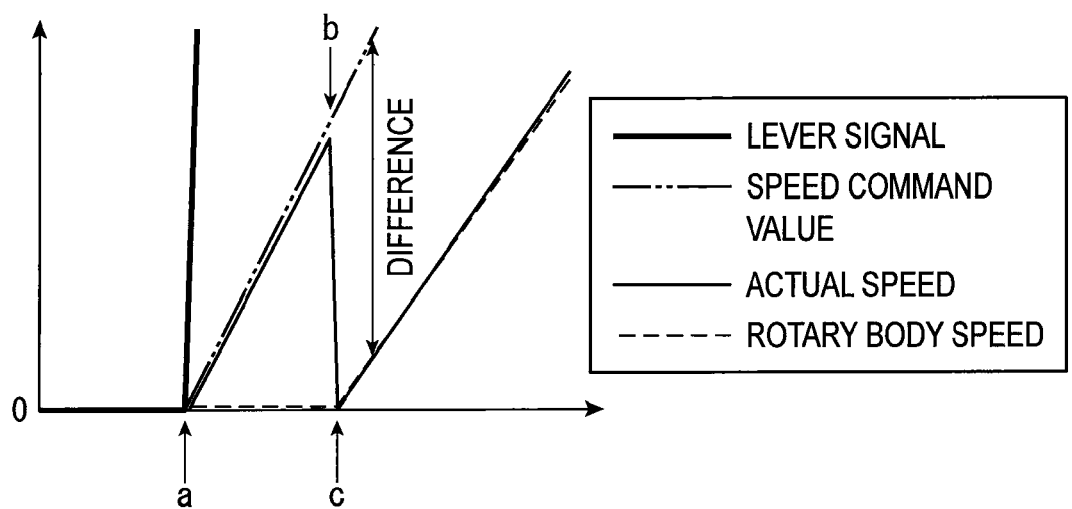
FIG. 7A is a diagram showing a portion at a rotation start point in FIG. 6A in an enlarged manner.
Figure 7B:
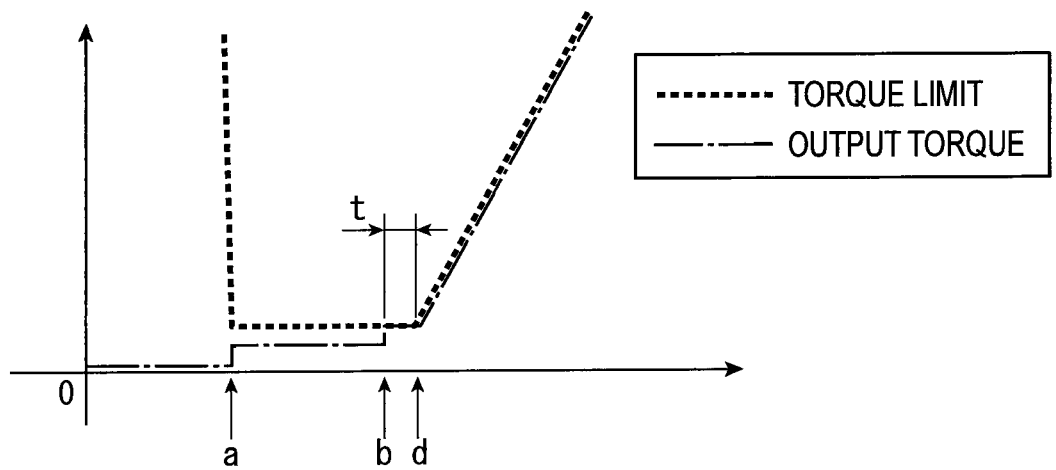
FIG. 7B is a diagram showing a portion at the rotation start point in FIG. 6B in an enlarged manner.
Figure 8A:
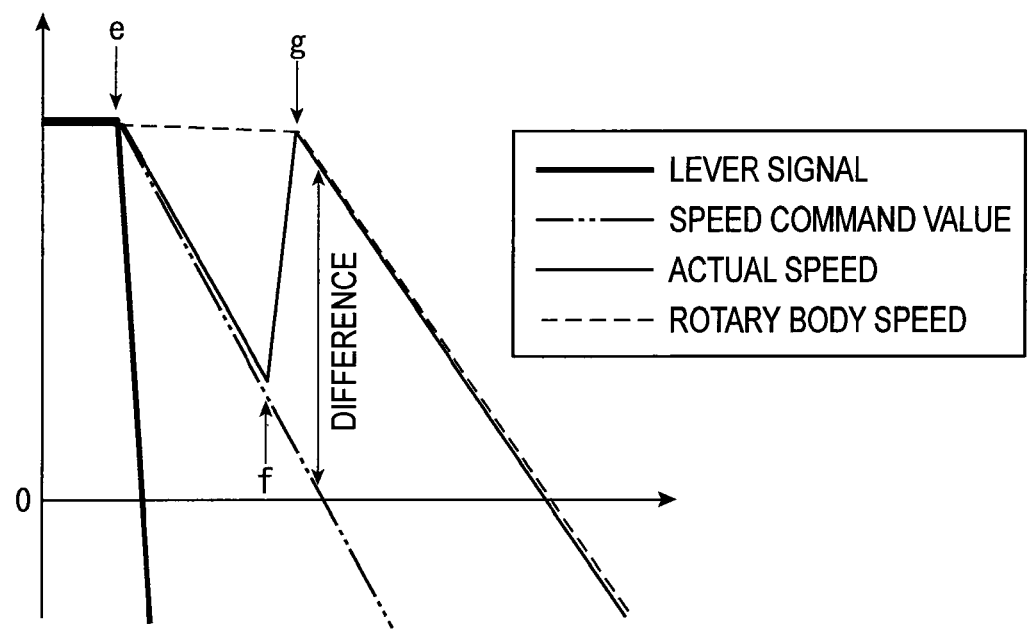
FIG. 8A is a diagram showing a portion at a deceleration start point in FIG. 6A in an enlarged manner.
Figure 8B:
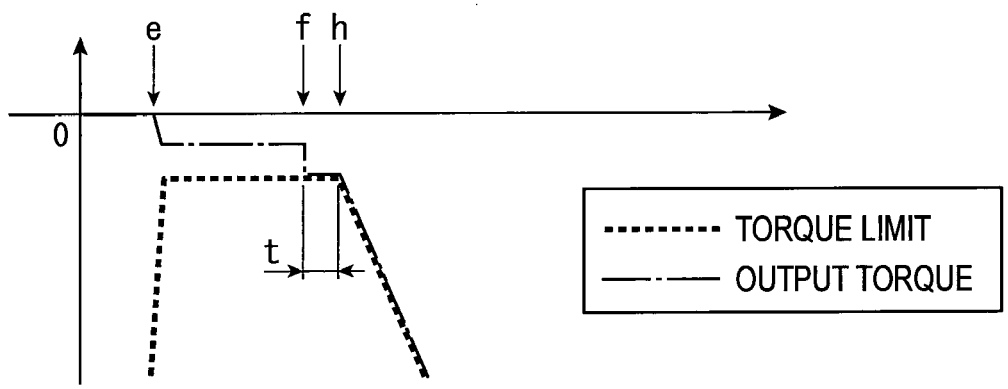
FIG. 8B is an enlarged diagram showing a portion at the deceleration start point in FIG. 6B in an enlarged manner.

FIG. 6A is a diagram showing the lever signal, the speed command value ωtar and the actual speed ωact of the electric motor 5 in a series of operation of the rotary body 4 from the start of the rotation from a stationary state, a rotation in a constant speed and to the stop of the rotation. FIG. 6B is a diagram showing a torque limit Tlim which is set during the series of operation and an actual output torque Tm. FIG. 7A and FIG. 7B are diagrams each showing an essential portion of the rotation start point in FIG. 6A and FIG. 6B in an enlarged manner. FIG. 8A and FIG. 8B are diagrams each showing an essential portion of the deceleration start point in FIG. 6A and FIG. 6B in an enlarged manner. It should be noted that each of the FIG. 7A and FIG. 8A shows a speed of rotary body 4, which is an actual speed of the rotary body 4.

Referring to FIG. 6A and FIG. 7A, when the rotation lever 10 is inclined, the lever signal rises substantially vertically and is inputted to the speed command value generating means 51 (arrow a). When the lever signal is input, the speed command value generating means 51 increases the speed command value ωtar substantially linearly, and along with the increase, the actual speed ωact of the electric motor 5 also rises. However, when there is a backlash between the gear 5A and the gear 3A, the speed of rotary body is zero while the gear 5A is rotating within the backlash as shown in an enlarged manner in FIG. 7A, and the rotary body 4 does not rotate.

At a point indicated with the arrow b, when the gear 5A comes into contact with the gear 3A and the backlash is eliminated, since a load applied to the electric motor 5 increases suddenly, the speed command value ωtar continues to increase, but the actual speed ωact of the electric motor 5 once becomes zero (arrow c). After that, from the point indicated with the arrow c, the actual speed rises again and the rotary body 4 also actually starts the rotation.

The actual output torque Tm of the torque limit and the electric motor 5 in this case will described with reference to FIG. 6B and FIG. 7B. Immediately after the lever signal is input, when the backlash determination means 61 determines that the gear 5A is rotated within the backlash, the torque limit setting means 63 limits the current torque limit of the upper MAX value Tmax to the very small value Ta close to zero (arrow a). Also, when the gear 5A rotates within the backlash, the actual speed ωact follows the speed command value ωtar with substantially no delay, and substantially no load is applied to the electric motor 5, so that the output torque (hereinafter, referred to as a drive torque) also becomes a very small value. When the backlash is eliminated at a point indicated with the arrow b, the drive torque is output at once. However, since the torque limit Tlim is limited to the very small value Ta, the drive torque is restricted not to exceed the very small value Ta. After that, the very small value of the torque limit Tlim is kept for a prescribed period of time t, and the drive torque is controlled to be equal to or smaller than the torque limit Tlim.

After the prescribed period of time t has elapsed (arrow d), the output control means 64 is activated and gradually changes the value of the torque limit Tlim. Since a difference between the speed command value ωtar and the actual speed ωact is large as shown in FIG. 7A, a large torque command value Ttar is input to the comparator in the inverter 52. However, since the value of the torque limit Tlim is limited to a state in which a constant inclination is maintained, the comparator selects a value having a smaller torque limit Tlim. Thus, the drive torque is gradually changed smoothly along the torque limit Tlim.

Referring back to FIG. 6A and FIG. 6B, when the rotation lever 10 is maintained at a prescribed angle, the speed command value ωtar becomes a constant value and the actual speed ωact of the electric motor 5 also becomes a constant speed, and the rotary body 4 accordingly starts a constant speed rotation. During the constant speed rotation of the rotary body 4, the torque limit value Tlim is changed up to the upper MAX value Tmax and the drive torque is kept to a constant value and then substantially returns to zero along with the constant speed rotation of the rotary body 4, because substantially no load is applied to the electric motor 5 under the constant speed rotation.

In contrast, at the deceleration start point of the rotary body 4, when the tilted rotation lever 10 is returned to a neutral position, the lever signal drops substantially vertically (arrow e) as shown in FIG. 6A and FIG. 8A. Accordingly, when the lever signal is input, the speed command value generating means 51 reduces the speed command value ωtar substantially linearly, and the actual speed ωact of the electric motor 5 also decreases along with the reduction. However, during the deceleration, even when the speed of the gear 5A is reduced, the speed of the rotary body 4 itself is not reduced due to its own inertia. While the gear 5A moves within the backlash between the gear 5A and the gear 3A as shown in an enlarged manner in FIG. 8A, the rotary body is maintained at a constant speed.

When the gear 5A comes into contact with the gear 3A and the backlash is eliminated at a point indicated with the arrow f, a force which accelerates the rotation of the electric motor 5 acts on the gear 5A. Therefore, although the speed command value ωtar continues to decrease, the actual speed ωact of the electric motor 5 returns to the constant speed (arrow g). Then, the actual speed drops again from the point indicated with the arrow g, and the speed of the rotary body 4 also actually decreases.

The torque limit Tlim and the actual output torque Tm of the electric motor 5 in this case will be described with reference to FIG. 6B and FIG. 8B. When the backlash determination means 61 determines that the gear 5A is rotated within the backlash, the torque limit setting means 63 changes the torque limit of the lower MAX value Tmax to a very small value Ta close to zero (arrow e). During the rotation within the backlash, the actual speed ωact follows the speed command value ωtar with substantially no delay, and the electric motor 5 is free from a force that accelerates the rotation thereof. Accordingly, a braking output torque (hereinafter referred to as a brake torque) also becomes a very small value. When the backlash is eliminated at the point indicated with the arrow f, the brake torque is output at once. However, since the torque limit Tlim is limited to the very small value, the brake torque is restricted not to exceed the torque limit Tlim. After that, the very small value of the torque limit Tlim maintained for the prescribed period of time t, and the brake torque is thus suppressed.

After the prescribed period of time t has elapsed (arrow h), the output control means 64 is activated and the value of the torque limit Tlim is gradually changed at a constant ratio. Since a difference between the speed command value ωtar and the actual speed ωact is large as shown in FIG. 8A, a large torque command value Ttar is input to the comparator of the inverter 52. However, since the value of the torque limit Tlim is limited to a state where a constant inclination is maintained, the comparator selects a smaller value of the torque limit Tlim. Accordingly, the brake torque is gradually changed smoothly along the torque limit Tlim.

Referring back to FIG. 6A and FIG. 6B, when the rotation lever 10 is returned to the neutral position, the speed command value ωtar becomes zero and the actual speed ωact of the electric motor 5 also becomes zero, so that the rotary body 4 stops accordingly. At this time, the value of the torque limit Tlim changes to the lower MAX value Tmax. Therefore, the brake torque is maintained at a constant level and then substantially returned to substantially zero according to the stop of the rotary body 4.

[1-5] Effect of First Embodiment

According to the first embodiment as described above, the following effects are obtained.

(1) The rotation controller 50 mounted on the electric rotary excavator 1 is provided with the backlash determination means 61 and the torque limit setting means 63. With the arrangement, since the output torque (drive torque, brake torque) of the electric motor 5 is limited by the torque limit Tlim when the backlash is eliminated, an excess torque is prevented from being output. After that, the output torque Tm of the electric motor 5 is gradually changed by the output control means 64 provided to the rotation controller 50, so that the rotary body 4 can be accelerated and decelerated without causing the operator to feel uncomfortableness. Accordingly, a shock generated when the backlash is eliminated can be reduced and a smooth rotation can be achieved without causing the operator to feel the influence of the backlash.

(2) The output control means 64 changes the output torque Tm with the sequentially changed torque limit Tlim as the limitation. Therefore, the output torque Tm can be reliably changed smoothly along the torque limit.

(3) The construction machine according to the first embodiment is the electric rotary excavator 1 in which the rotary body 4 is rotated by the electric motor 5. A conventional electric rotary excavator causes the operator to clearly feel the existence of the backlash due to its too good response to the rotation. In contrast, since the electric rotary excavator 1 of the present embodiment is provided with the above-mentioned rotation controller 50, the operator does not feel such an existence of backlash. Moreover, the excellent response can be utilized in other sections. Thus, very large advantages can be obtained by mounting the rotation controller 50 according to the present invention on the electric rotary excavator 1.

Second Embodiment

Figure 9:
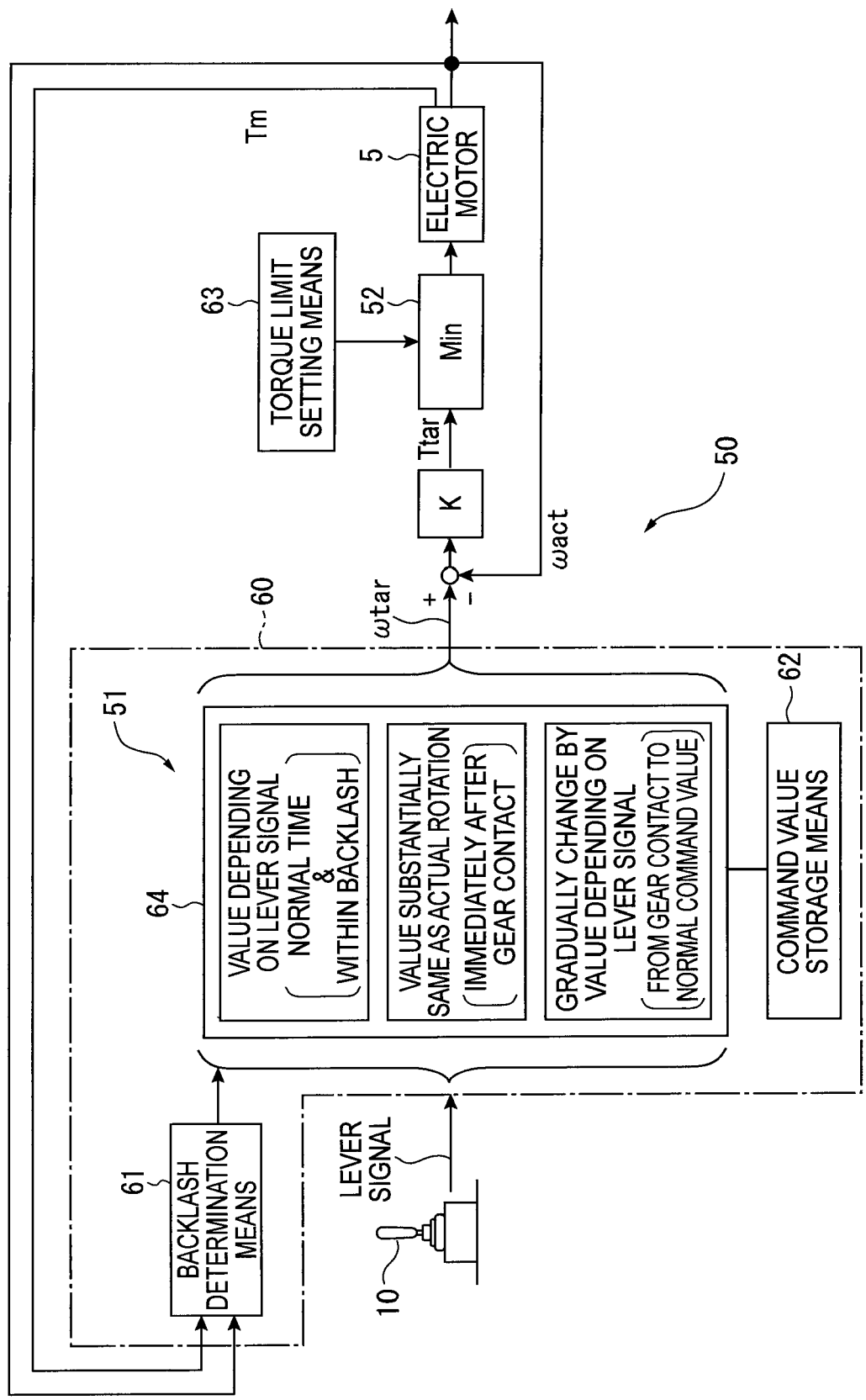
FIG. 9 is a diagram for illustrating a rotation controller and a gear drive controller according to a second embodiment.

FIG. 9 is a diagram for illustrating the rotation controller 50 and the gear drive controller 60 according to a second embodiment of the present invention. FIG. 10 shows a control flowchart. It should be noted that, in these figures, components to the same as those in the above-described first embodiment will be given the same reference numerals and symbols, and descriptions thereof will be omitted or simplified.

Referring to FIG. 9 and FIG. 10, the second embodiment is greatly different from the first embodiment in the function of the output control means 64. In addition, the second embodiment is greatly different from the first embodiment in that the command value storage means 62 stores the speed command value instead of the torque limit.

The output control means 64 according to the second embodiment is provided as a part of the speed command value generating means 51. In ST3 shown in FIG. 10, the output control means 64 first determines whether or not the previous determination was made immediately after the elimination of the backlash. When it is determined as "N", the process returns to the first step. Needless to say, that the torque limit Tlim at this time is returned to the normal MAX value Tmax. On the other hand, in a first determination immediately after a prescribed time has elapsed from the elimination of the backlash, in this case also the torque limit Tlim is returned to the normal MAX value Tmax. However, since the rotation has been made within the backlash, the determination in ST3 becomes "Y", and the process proceeds to ST4.

In ST4, immediately after the backlash has been eliminated, the speed command value ωtar is changed in a sliding manner to substantially the same value close to the actual speed ωact of the electric motor 5, and from this value, the speed command value ωtar is sequentially changed based on the lever signal using the value stored in the command value storage means 62 similarly to a conventional manner. In the first embodiment, the torque limit Tlim is sequentially changed to smoothly output the output torque and the control torque in the first embodiment. In the second embodiment, the speed command value ωtar is changed in the sliding manner, and from this point, the speed command value ωtar is changed, thereby achieving the same function as that in the first embodiment.

This process will be described further in detail with reference to FIGS. 11 through 13.

Figure 11A:
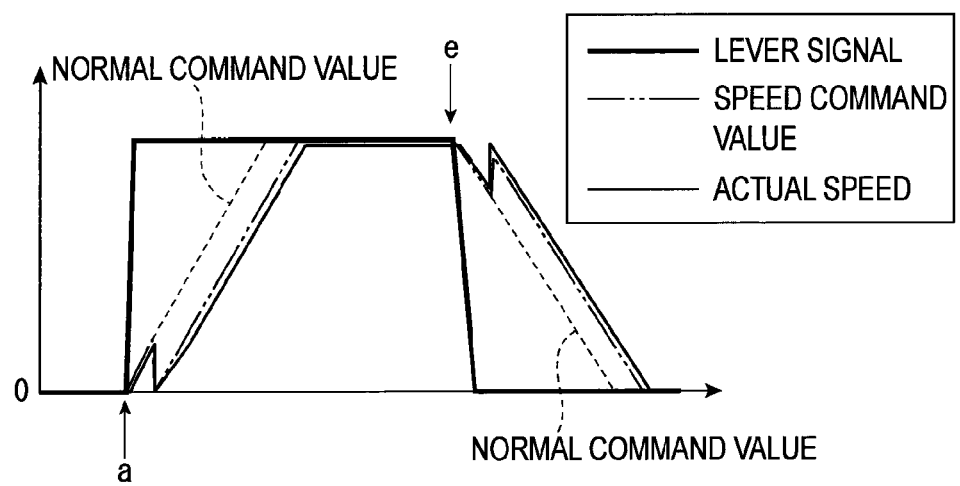
FIG. 11A is a diagram for illustrating in detail a rotation control method of the second embodiment.
Figure 11B:
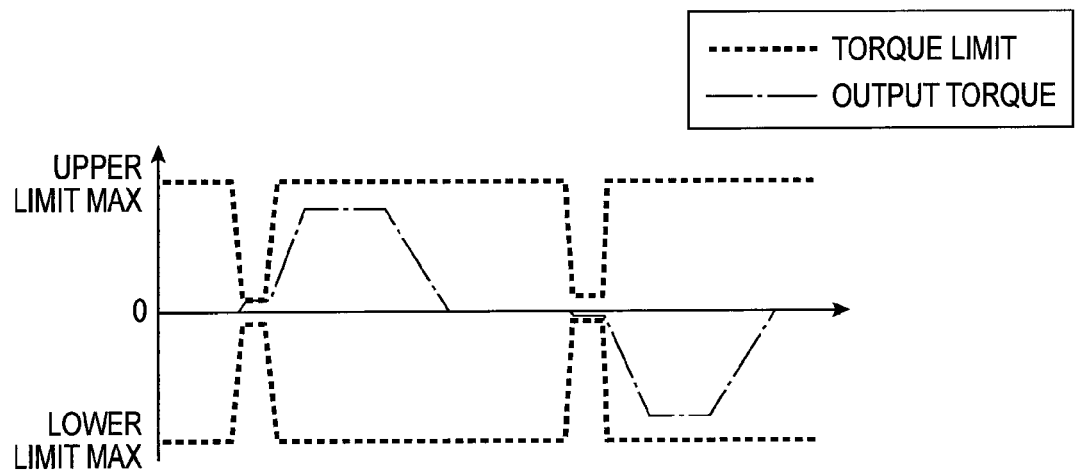
FIG. 11B is a diagram for illustrating in detail a rotation control method of the second embodiment.
Figure 12A:
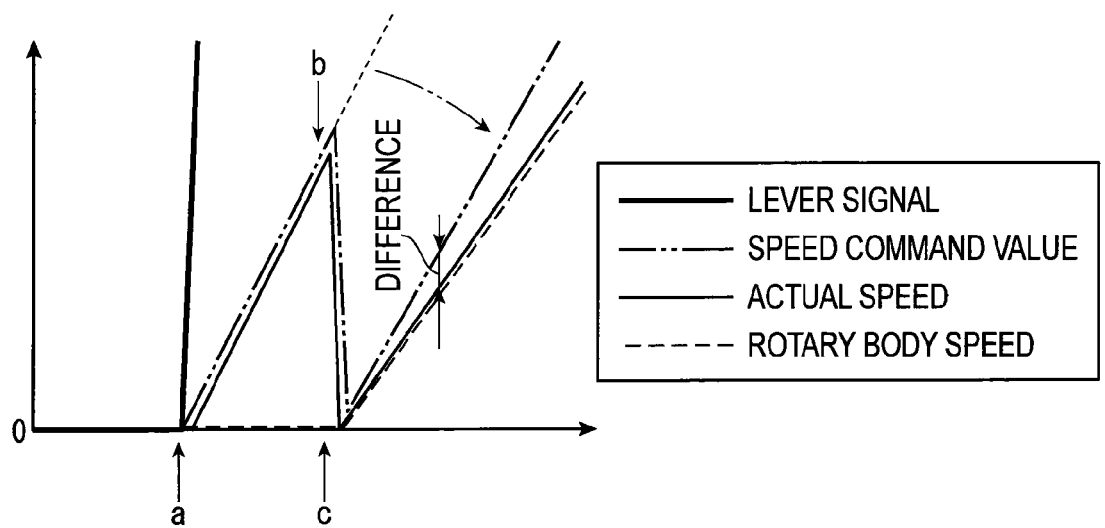
FIG. 12A is a diagram showing a portion at a rotation start point in FIG. 11A in an enlarged manner.
Figure 12B:
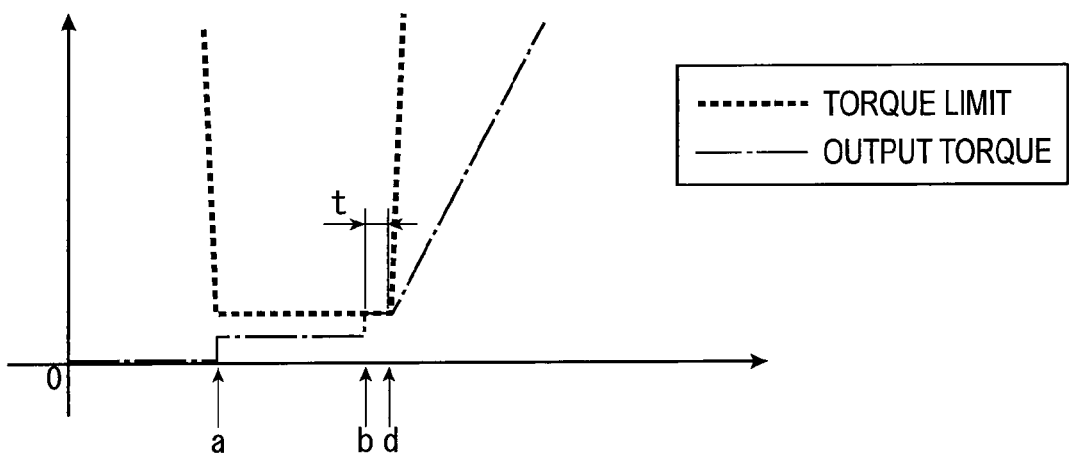
FIG. 12B is a diagram showing a portion at the rotation start point in FIG. 11B in an enlarged manner.

Referring to FIG. 11A and FIG. 12A, when the lever signal is input to the speed command value generating means 51 (arrow a) and it is determined that the rotation is within the backlash, the output control means 64 generates and outputs the speed command value ωtar depending on the lever signal in a normal manner during the rotation within the backlash. As a result, as shown in FIG. 11B and FIG. 12B, the output torque Tm of the electric motor 5 is maintained to a very small value similarly to the first embodiment. Needless to say, during the above process, the value of the torque limit Tlim is also set to a very small value similarly to the first embodiment.

After that, when the gear 5A comes into contact with the gear 3A and the backlash is eliminated (arrow b), the actual speed ωact becomes zero. And at the same time, the output control means 64 changes in the sliding manner the speed command value ωtar to zero close to the actual speed ωact (arrow c). After completing the change in the sliding manner, the speed command value ωtar is changed based on the lever signal using the value stored in the command value storage means 62, and the actual speed ωact also follows to change. This change is continued until the speed command value ωtar returns to the normal command value (FIG. 10A).

Meanwhile, the torque limit value at this time is changed to the normal MAX value Tmax after a prescribed period of time t has elapsed from the elimination of the backlash. However, since the difference between the speed command value ωtar and the actual speed ωact is small, the output torque (drive torque) is set to a value depending on the lever signal and is gradually changed, so that a smooth operation at the rotation start point is realized.

Figure 13A:
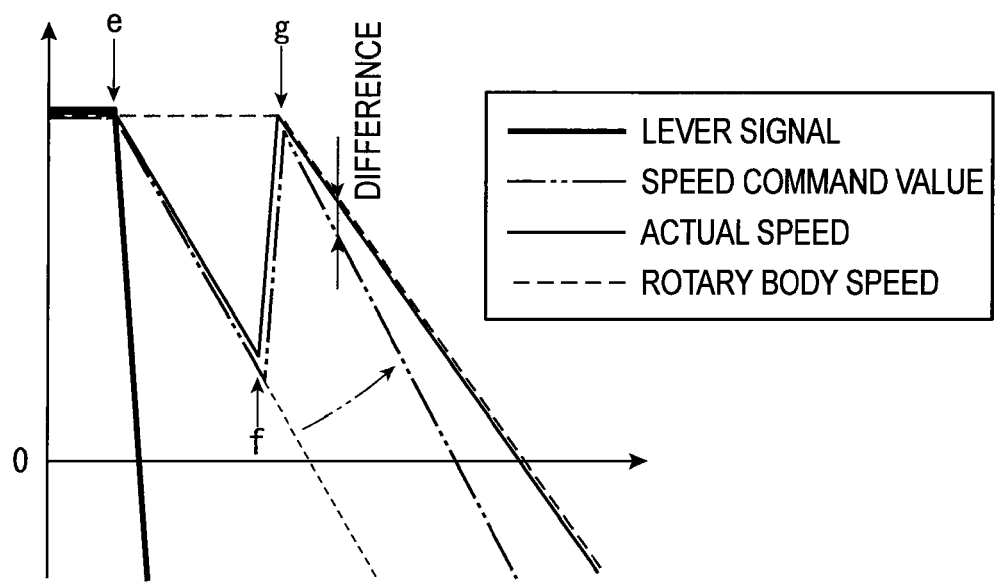
FIG. 13A is a diagram showing a portion at a deceleration start point in FIG. 11A in an enlarged manner.
Figure 13B:
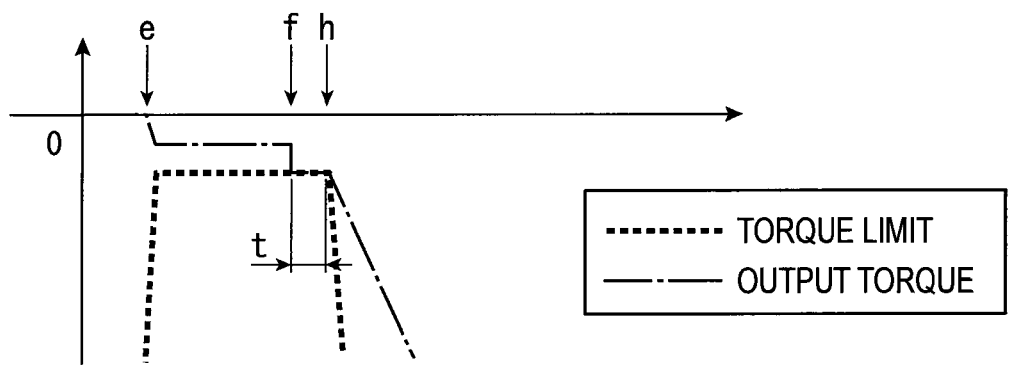
FIG. 13B is a diagram showing a portion at a deceleration start point in FIG. 11B in an enlarged manner.

FIG. 13A and FIG. 13B show the control during the deceleration in an enlarge manner. When the backlash is eliminated at the point indicated with the arrow f the output control means 64 changes in the sliding manner the speed command value ωtar to a value substantially the same as the actual speed ωact as the actual speed ωact of the electric motor 5 returns to maintain the previous constant speed (arrow g). As a result, after the prescribed period of time t has elapsed, the value of the torque limit Tlim returns to the normal MAX value Tmax (arrow h). However, the output torque (brake torque) is set to a value that is determined based on the lever signal and is gradually changed.

Although the description is omitted, similarly to the first embodiment, the rotation controller 50 according to the second embodiment is provided with the backlash determination means 61 and the torque limit setting means 63. Accordingly, the same effects as the above-mentioned effects (1) and (3) can be obtained. In addition, owing to an arrangement unique to the second embodiment, the following effect is obtained.

(4) According to the second embodiment, since the speed command value ωtar is changed to a value close to the actual speed ωact once and then changed from this point based on the lever signal, the output torque Tm also can be changed gradually according to the speed command value ωtar. Unlike the first embodiment in which the torque limit Tlim is changed gradually and the output torque Tm is also changed along the torque limit Tlim, since external noises can be prevented from affecting the torque limit Tlim during the change, a stable control free from the external noises can be obtained, resulting in an enhanced reliability.

The present invention is not limited to the above-described embodiments but may include other arrangements for achieving the object of the present invention, and accordingly the following modifications should be included within the present invention.

For example, in the above embodiments, the output torque Tm of the electric motor 5 is used to determine whether or not the gear 5A is rotating within the backlash. However, in place of the output torque Tm, the current value output to the electric motor 5 may be used.

Also, in ST11 in FIG. 4, it is arranged so that, when the output torque Tm is substantially equal to the acceleration torque Tfree in idle running, the process proceeds to ST12. However it may be arranged so that the process proceeds to ST12 when the output torque Tm is equal to or smaller than a prescribed threshold value, when the current value is smaller than a prescribed threshold value, or in a case where a speed gain K is small, when the difference between the speed command value ωtar and the actual speed ωact is smaller than a prescribed threshold value.

Further, the followings may be defined as "rotate within the backlash"; i.e., a specific period of time after detecting start of the rotating of the rotary body 4, a specific period of time after a determination that an acceleration operation is made after a constant speed rotation operation, or a specific period of time after a determination that deceleration operation is made from the constant speed rotation operation or acceleration rotation operation, etc.

Furthermore, in a case where a speed sensor for detecting rotating speed of the rotary body 4 itself (the rotary body speed in FIG. 7A and FIG. 13A) is provided, it may be defined as "rotate within the backlash" when the difference between the actual speed of the electric motor 5 and the actual speed of the rotary body 4 is larger than a prescribed threshold value.

In the above embodiments, the electric rotary excavator 1 equipped with the electric motor 5 has been described. The construction machine of the present invention is not limited to the above but may be a typical hydraulic excavator. Therefore, the drive source of the present invention is not limited to the electric motor 5 but may be a hydraulic motor or the like.

Although the present invention is particularly illustrated and described mainly with respect to specific embodiments, it is possible for those skilled in the art to add various modifications to the above-described embodiments without departing the technical spirit and/or object of the present invention.

INDUSTRIAL APPLICABILITY

The present invention is applicable to drive of gears meshing with each other including a backlash therebetween, and is applicable to all sorts of construction machines arranged to rotate via such gears.

The invention claimed is:

1. A gear drive controller that controls driving of a driving gear of gears meshing with each other including a backlash therebetween, the gear drive controller comprising:
   a backlash determination means that determines that the driving gear or a driven gear is rotating within the backlash when (i) an output torque of a drive source is smaller than an acceleration torque in idle running of the drive source with a first prescribed value added to the acceleration torque in idle running and (ii) an angular acceleration of the drive source is equal to or greater than a second prescribed value;
   a command value storage means that stores a command value for changing the output torque of the drive source;
   a torque limit setting means that, when it is determined that the driving gear or the driven gear is rotating within the backlash, sets a torque limit so as to limit the output torque of the drive source at a point of elimination of the backlash; and
   an output control means that controls the command value to gradually change so that the output torque of the drive source is gradually changed to an upper or lower limit after the backlash is eliminated.

2. The gear drive controller according to claim 1, wherein:
   the command value is the torque limit, and
   the output control means gradually changes the output torque to the upper or lower limit by gradually changing the torque limit.

3. The gear drive controller according to claim 1, wherein:
   the command value is a speed command value output according to a rotation operation, and
   the output control means changes the speed command value to a value close to an actual speed immediately after the backlash is eliminated, thereby gradually changing the output torque to the upper or lower limit.

4. A rotation controller that controls a rotary body that rotates via gears meshing with each other including a backlash therebetween, the rotation controller comprising:

a gear drive controller that controls driving of a driving gear, wherein the gear drive controller includes:
  a backlash determination means that determines that the driving gear or a driven gear is rotating within the backlash when (i) an output torque of a drive source is smaller than an acceleration torque in idle running of the drive source with a first prescribed value added to the acceleration torque in idle running and (ii) an angular acceleration of the drive source is equal to or greater than a second prescribed value;
  a command value storage means that stores a command value for changing the output torque of the drive source;
  a torque limit setting means that, when it is determined that the driving gear or the driven gear is rotating within the backlash, sets a torque limit so as to limit the output torque of the drive source at a point of elimination of the backlash; and
  an output control means that controls the command value to gradually change so that the output torque of the drive source is gradually changed to an upper or lower limit after the backlash is eliminated.

5. A gear drive control method for controlling driving of a driving gear of gears meshing with each other including a backlash therebetween, the method comprising:
  determining, via a controller, that the driving gear or a driven gear is rotating within the backlash when (i) an output torque of a drive source is smaller than an acceleration torque in idle running of the drive source with a first prescribed value added to the acceleration torque in idle running and (ii) an angular acceleration of the drive source is equal to or greater than a second prescribed value;
  setting a torque limit so as to limit the output torque of the drive source at a point of elimination of the backlash when it is determined that the driving gear or the driven gear is rotating within the backlash; and
  gradually changing the output torque of the drive source to an upper or lower limit after the backlash is eliminated.

6. A construction machine, comprising:
a rotary body that rotates via gears meshing with each other including a backlash therebetween; and
a rotation controller that controls the rotary body,
wherein the rotation controller includes a gear drive controller that includes:
  a backlash determination means that determines that a driving gear or a driven gear is rotating within the backlash when (i) an output torque of a drive source is smaller than an acceleration torque in idle running of the drive source with a first prescribed value added to the acceleration torque in idle running and (ii) an angular acceleration of the drive source is equal to or greater than a second prescribed value;
  a command value storage means that stores a command value for changing the output torque of the drive source;
  a torque limit setting means that, when it is determined that the driving gear or the driven gear is rotating within the backlash, sets a torque limit so as to limit the output torque of the drive source at a point of elimination of the backlash; and
an output control means that controls the command value to gradually change so that the output torque of the drive source is gradually changed to an upper or lower limit after the backlash is eliminated.

* * * * *